United States Patent
Fenoglio et al.

(10) Patent No.: US 10,478,685 B2
(45) Date of Patent: Nov. 19, 2019

(54) ACCESSORY RACK FOR A GOLF CART

(71) Applicants: Tony Fenoglio, Montague, TX (US); Steven Brian Tettleton, Nocona, TX (US)

(72) Inventors: Tony Fenoglio, Montague, TX (US); Steven Brian Tettleton, Nocona, TX (US)

(*) Notice: Subject to any disclaimer, the term of this patent is extended or adjusted under 35 U.S.C. 154(b) by 0 days.

(21) Appl. No.: 16/459,865

(22) Filed: Jul. 2, 2019

(65) Prior Publication Data

US 2019/0321699 A1    Oct. 24, 2019

Related U.S. Application Data

(62) Division of application No. 15/718,172, filed on Sep. 28, 2017.

(51) Int. Cl.
| | |
|---|---|
| *A63B 55/00* | (2015.01) |
| *A63B 55/50* | (2015.01) |
| *B60R 9/06* | (2006.01) |
| *B60R 9/08* | (2006.01) |

(52) U.S. Cl.
CPC .............. *A63B 55/50* (2015.10); *B60R 9/06* (2013.01); *B60R 9/08* (2013.01)

(58) Field of Classification Search
CPC .............. A63B 55/50; B60R 9/06; B60R 9/08
USPC ........................................................ 224/274
See application file for complete search history.

(56) References Cited

U.S. PATENT DOCUMENTS

| | | | | |
|---|---|---|---|---|
| 2,822,969 | A * | 2/1958 | Cooper .................... | B60R 9/00 224/42.32 |
| 2,919,758 | A * | 1/1960 | Newton ................. | B62K 5/027 180/210 |
| 3,671,071 | A * | 6/1972 | Evinrude ................. | B60N 2/10 296/69 |
| 3,884,439 | A * | 5/1975 | Jeninga .................... | B62B 1/02 248/96 |
| 4,533,013 | A * | 8/1985 | Hightower ............. | B62K 5/027 180/210 |
| 4,699,418 | A * | 10/1987 | Plavetich ............... | B60N 2/206 296/65.09 |
| 8,376,443 | B2 * | 2/2013 | Kemp .................. | B60N 2/3013 296/50 |
| 10,081,275 | B2 * | 9/2018 | Kluka .................. | B60N 2/3097 |

* cited by examiner

*Primary Examiner* — Peter N Helvey
(74) *Attorney, Agent, or Firm* — Whitaker Chalk Swindle & Schwartz PLLC; Charles D. Gunter, Jr.

(57) ABSTRACT

An accessory rack for a golf cart is shown for use in a golf cart having a fold-out rear seat. One or more of the racks can be installed without modification of the golf cart. The rack is secured to the golf cart in such a way as to allow a golf bag to be securely attached within the fold-out seat area at a desired height or angle to facilitate easier club retrieval and selection while keeping the bag secure when the cart is in motion. The rack can also be easily attached and removed for easy transfer and storage.

8 Claims, 6 Drawing Sheets

ACCESSORY RACK FOR A GOLF CART

CROSS REFERENCE TO RELATED APPLICATIONS

The present application is a divisional application of prior Ser. No. 15/718,172, filed Sep. 28, 2017, entitled "Accessory Rack For A Golf Cart", by the same inventors.

BACKGROUND OF THE INVENTION

Field of the Invention

The present invention relates generally to racks and holders for golf club bags and, more specifically, to a rack for a golf bag to be mounted on a motor driven golf cart.

Description of the Prior Art

The sport of golf has always enjoyed a great deal of popularity over the years both domestically and internationally. A typical golfer uses a large bag to hold the necessary golf clubs and other accessories. Many golfers either carry this large bag of clubs and accessories which the sport requires or pull their bags of clubs on wheeled carts around the golf course. However, many golfers prefer to navigate the course in a motor driven cart. Many golf and country clubs in fact require the use of motor driven carts by the golfers who play these courses. The use of motorized carts is thought to decrease playing time and permit more golfers to play the course in a given time interval.

Various arrangements of golf cart type vehicles are known and manufactured by companies including EZ-GO™, Club Car™, Yamaha™, Textron™, and Fairplay™, and are represented by such disclosures as those shown in U.S. Design Pat. Nos. D345,717; D369,762; D373,099; D395,023; D498,704; D514,981; and D746,174. These designs are merely intended to be typical of various types of golf carts which are available at the present time.

In many instances, known golf cart type recreational vehicles provide storage space in the rear portion of the cart so that various items in addition to a driver and a passenger, may also be transported. Further, it is known to provide additional seating in the rear of such carts. This type of seating may be configured to face forward or rearward and in some cases, the seat back can be flipped down or out to reveal a flat tray area that serves as a utility transport area. It is also possible to purchase conversion "kits" to add a fold-out rear seat to a standard golf cart. Such a kit is sold, for example, as the EZ-GO™ "Classic" Rear Flip Back Seat Kit, designed to fit the Yamaha EZ-GO Club Car™.

Where the golf cart features a fold-down or fold-out rear seat, there is usually no convenient place to securely retain one or more golf club bags. If the bags are merely laid flat in the rear storage area, there is the possibility that items in the bags may fall out during transport or the bags themselves may fall out. Also, the bags are not oriented at a convenient angle to allow a player to select the desired club during play.

In light of these recognized deficiencies in known golf cart designs, alternative seating accessories that provide a configuration variety to afford maximum use of the golf cart remains a desired goal. This is particularly true in the area of accessories for securely holding golf bags in the situation previously described.

Thus, while various implementations of golf cart seating accessories and golf bag securing configurations have been developed, no design has emerged that generally encompasses all of the desired characteristics as hereafter presented in accordance with the presently defined invention.

SUMMARY OF THE INVENTION

The present invention is directed toward an accessory rack for a golf cart for use with a golf cart having a fold-out rear seat area that forms a flat utility transport area defined between side rails of the cart. The accessory rack has a centrally located support beam and a pair of bag receiving elements spaced apart at each of opposite ends of the centrally located support beam. The bag receiving elements define a pair of generally U-shaped openings.

A pivot leg attaches the centrally located support beam to a selected side rail of the transport area. The pivot leg has an inner extent attached to the support beam at a pivot point and has an oppositely arranged outer extent which terminates in an attachment bracket which engages the selected side rail of the transport area of the cart.

The centrally located support beam has a longitudinal foot piece arranged generally perpendicular to the support beam at an outer extent thereof opposite the pivot leg. The foot piece rests on the flat utility transport area defined between the side rails when the rack is in place on the golf cart. The support beam also has a bag support plate which extends upwardly from the foot piece in a plane generally perpendicular to the plane of the support beam for supporting an end of a golf bag in use.

The pivot leg allows the support beam to be positioned so that it forms an angle with respect to the flat utility transport area of the cart when in place. The angle is selected to orient a golf bag at a convenient angle to allow a player to select a desired club from the golf bag during play. While the angle may depend somewhat on the exact configuration of the utility area and side rails of the golf cart, it will generally be in the range from about 30 to 60 degrees with respect to the flat utility transport area of the cart.

More than one of the accessory racks can be mounted in the utility transport area of the cart. The accessory racks can thus easily accommodate two players who are riding in the motorized cart.

A method is also shown for securing one or more golf bags in a golf cart where the golf cart has a fold-out rear seat area that forms a flat utility transport area defined between side rails when folded-out. The fold-out rear seat is first folded-out to form the flat utility transport area previously described. The accessory rack is then mounted between the side rails of the utility area with the foot piece resting on the flat utility area and the outer extent of the pivot leg engaging a selected one of the side rails. A golf bag can then be placed on the accessory rack within the U-shaped openings on the support beam.

Additional objects, features and advantages will be apparent in the written description which follows.

DETAILED DESCRIPTION OF THE INVENTION

The preferred version of the invention presented in the following written description and the various features and advantageous details thereof are explained more fully with reference to the non-limiting examples included and as detailed in the description which follows. Descriptions of well-known components and processes and manufacturing techniques are omitted so as to not unnecessarily obscure the principal features of the invention as described herein. The examples used in the description which follows are intended merely to facilitate an understanding of ways in which the invention may be practiced and to further enable those skilled in the art to practice the invention. Accordingly, the examples should not be construed as limiting the scope of the claimed invention.

Figure 1:
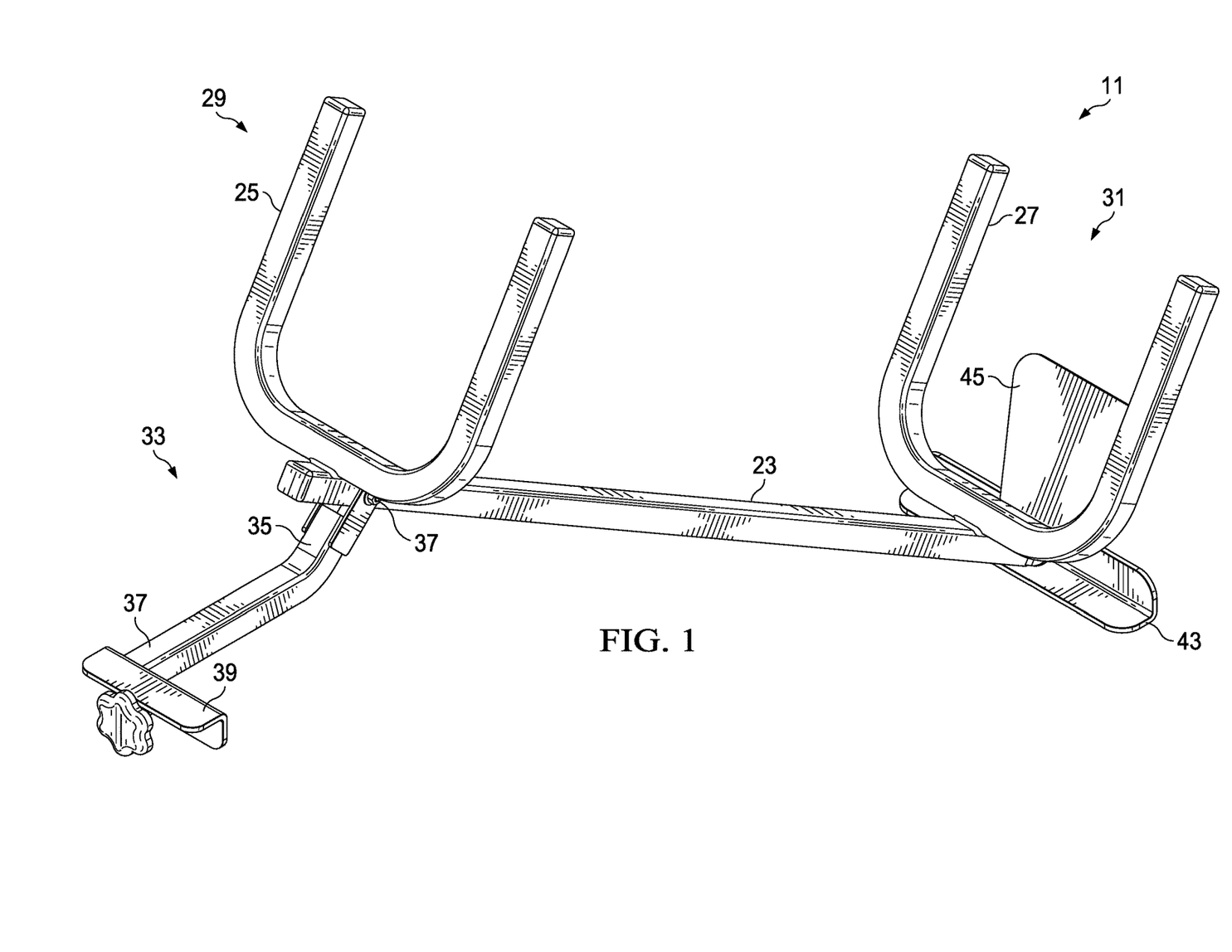
FIG. 1 is a perspective view of the accessory rack for a golf cart of the invention.
Figure 2:
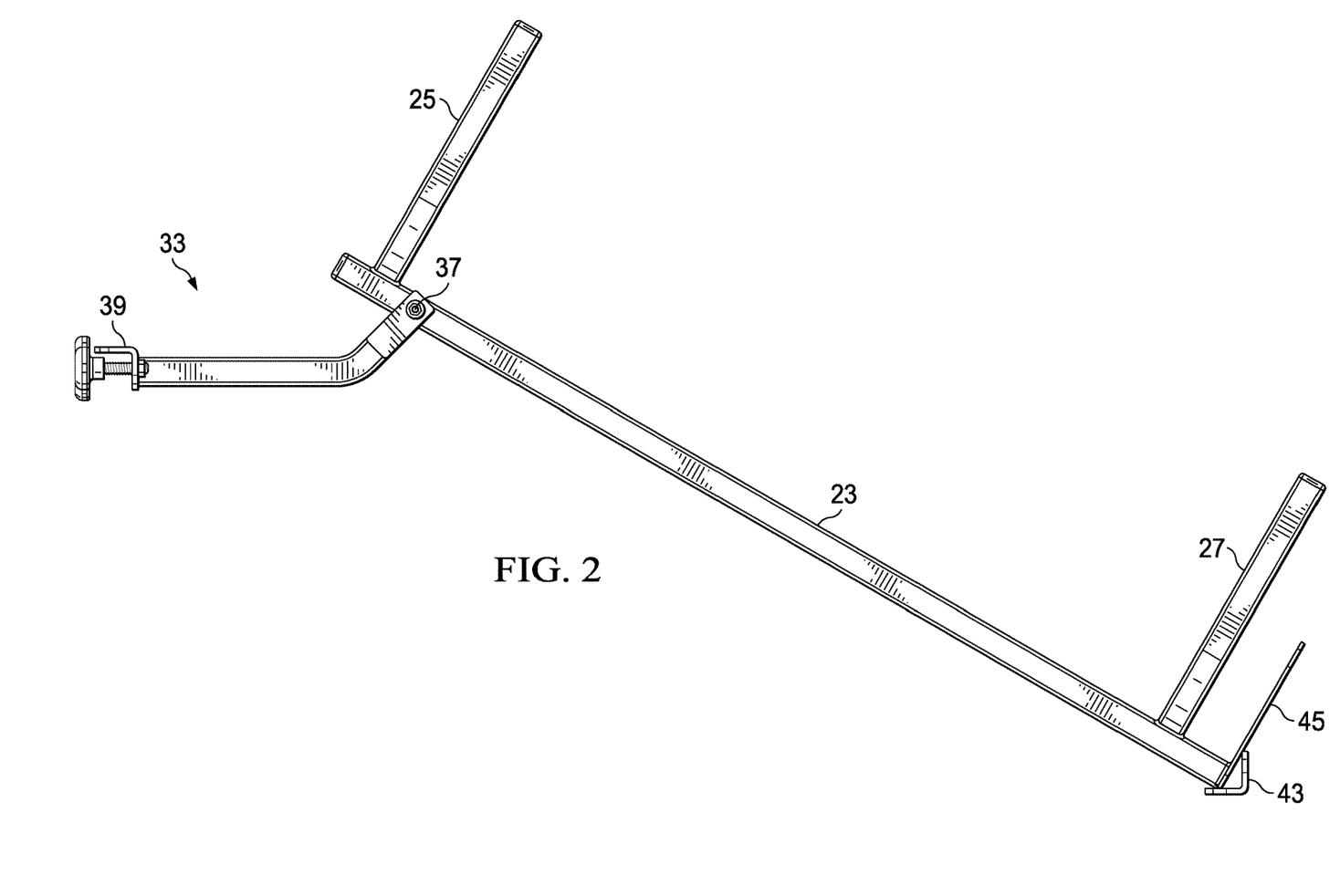
FIG. 2 is a right side view of the accessory rack for a golf cart of FIG. 1.
Figure 3:
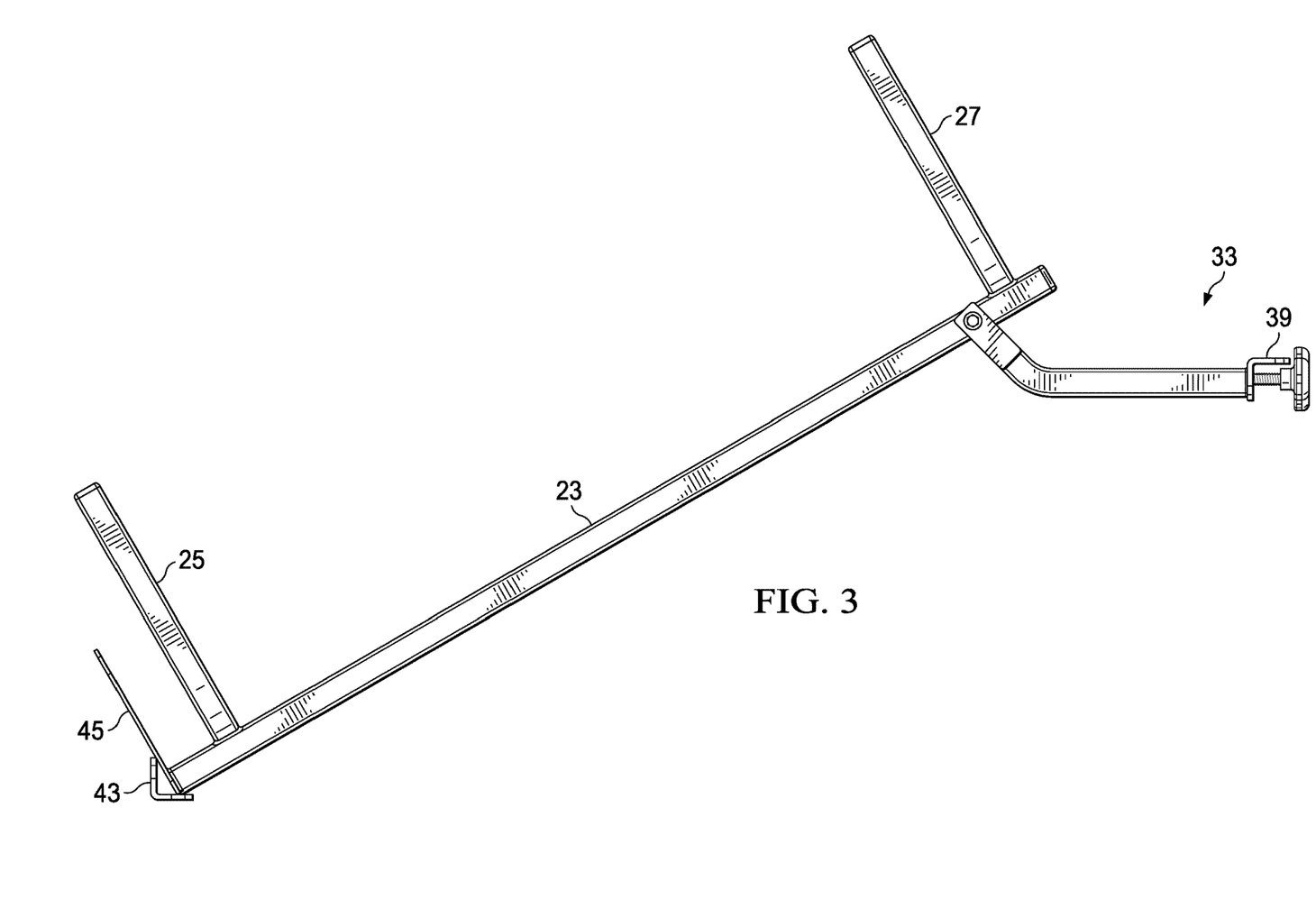
FIG. 3 is a left side view of the accessory rack for a golf cart of FIG. 1.
Figure 4:
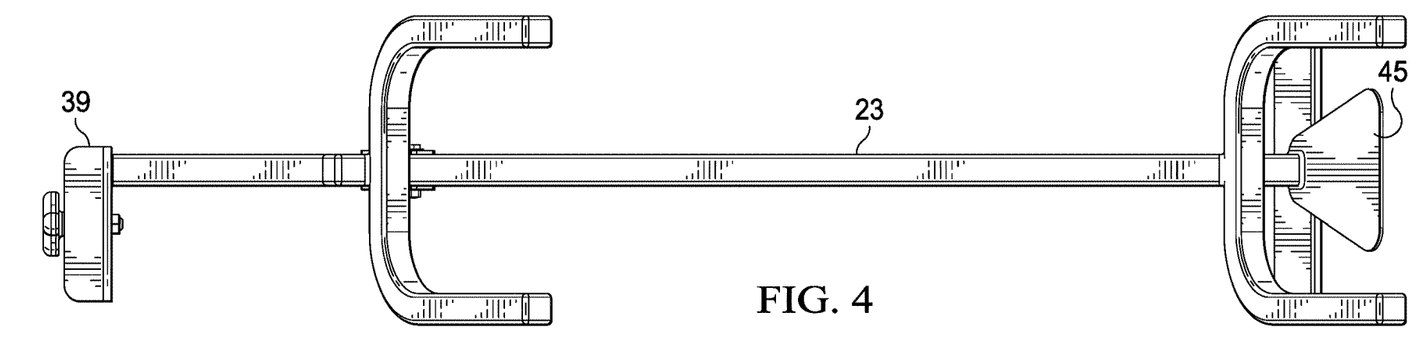
FIG. 4 is a top plan view of the accessory rack for a golf cart of FIG. 1.
Figure 8:
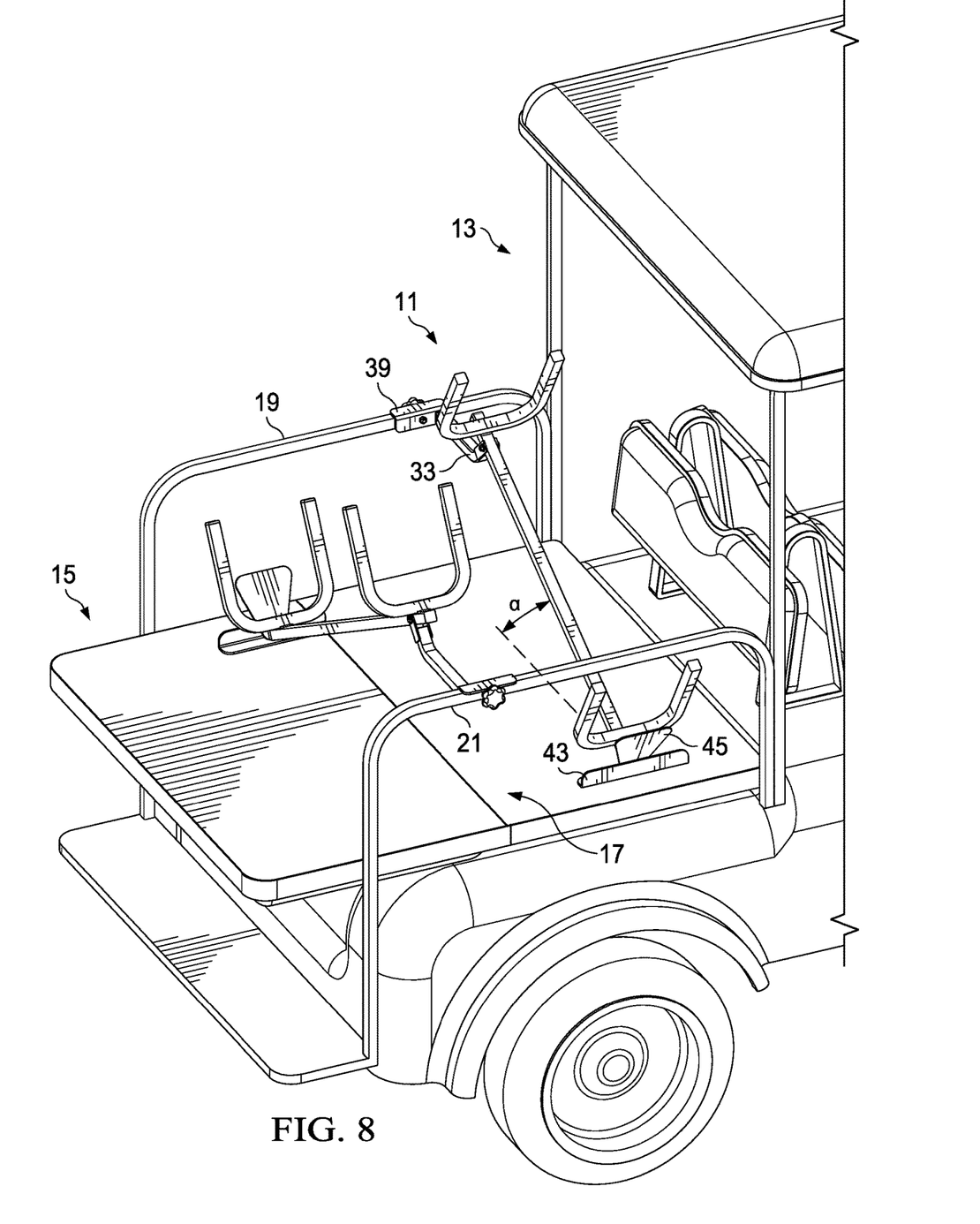
FIG. 8 is an environmental view of the accessory rack for a golf cart of the invention showing a pair of the accessory racks mounted in the rear utility transport area of a golf cart, the golf cart being shown in broken lines.

Turning now to FIG. 1 of the drawings, there is shown an accessory rack for a golf cart of the invention, designated generally as 11. The accessory rack 11 is intended to be used with a golf cart having a fold-out rear seat area. As briefly discussed, such golf carts are available as original manufacture items and are commercially available in the marketplace from a variety of sources. Several manufacturers also offer adapter or conversion "kits" which can be used to retrofit a standard golf cart with a fold-out seat. With reference to FIG. 8, there is shown a golf cart 13 having a fold-out seat which forms a flat utility transport area 17 defined between side rails 19, 21 of the cart. The underside of the fold-out seat 15 would normally form a cushioned surface for a rider when the seat is folded up.

With reference again to FIG. 1, the accessory rack 11 of the invention has a centrally located support beam 23 which can be formed of channel iron, aluminum, or similar materials. The particular support beam 23 shown in FIG. 1 has a generally square or rectangular cross section.

A pair of bag receiving elements 25, 27 are spaced apart at each of opposite ends of the centrally located support beam 23. The bag receiving elements defining a pair of generally U-shaped openings 29, 31. The U-shaped bag receiving elements can be affixed to the support beam 23, as by tack welding, or the like.

Figure 5:
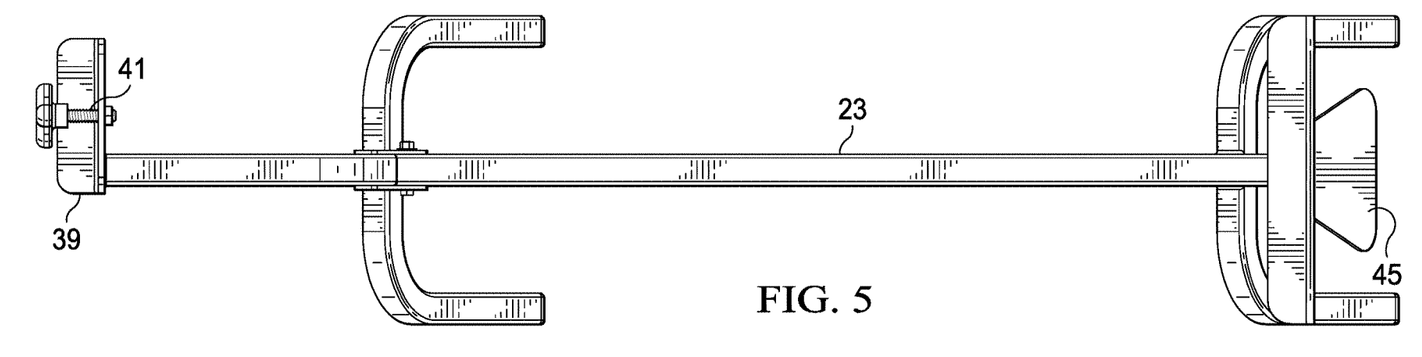
FIG. 5 is a bottom plan view of the accessory rack for a golf cart of FIG. 1.
Figure 6:
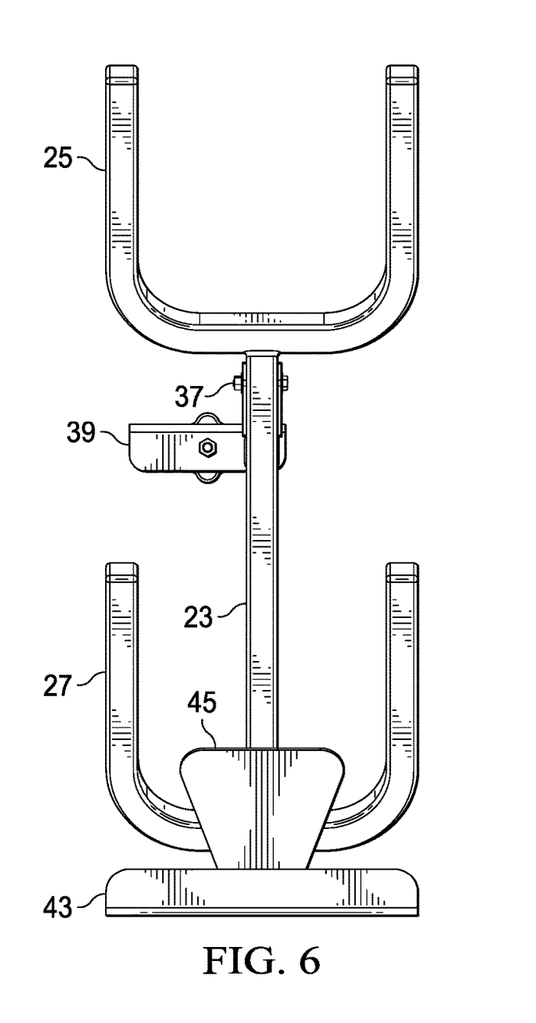
FIG. 6 is a top end view of the accessory rack for a golf cart of FIG. 1.
Figure 7:
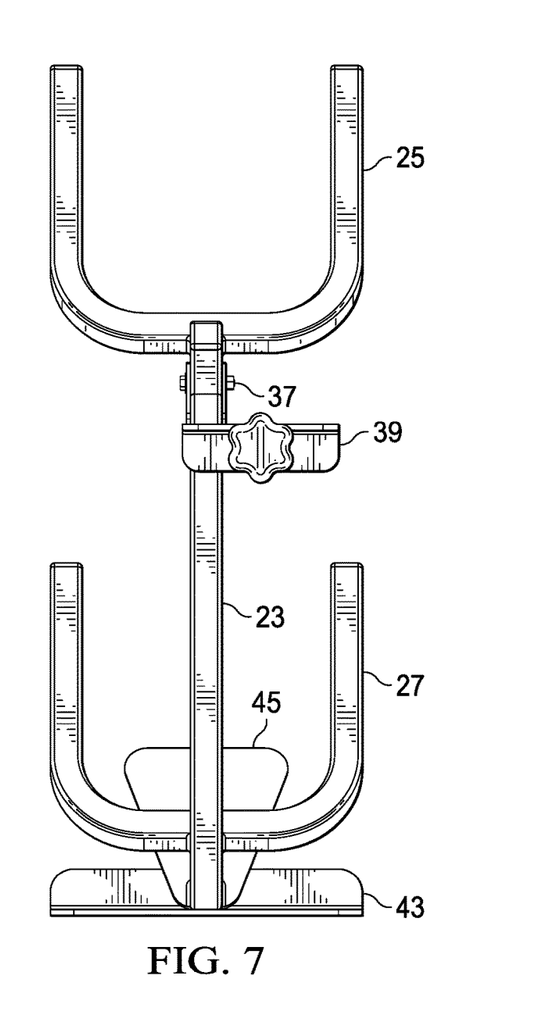
FIG. 7 is a bottom end view of the accessory rack for a golf cart of FIG. 1.

A pivot leg 33 is provided for attaching the centrally located support beam 23 to a selected side rail (19 in FIG. 8) of the transport area 17. The pivot leg has an inner extent 35 attached to the support beam 23 at a pivot point 37. The pivot leg also has an oppositely arranged outer extent 37 which terminates in an attachment bracket 39 which engages the selected side rail 19 of the transport area of the cart. The exact nature of the attachment bracket 39 might vary depending, for example, upon the size and shape of the side rail 19 of the cart. In the example shown in FIG. 5 of the drawings, the attachment bracket is mounted to the side rail 19 of the cart by a threaded bolt 41 which is received within a mating threaded opening (not shown) provided in the side rail 19. Other attachment mechanisms can also be visualized such as, for example, a flexible cable such as a commercially available nylon cable tie.

As can also be seen from FIG. 1, the support beam 23 also has a longitudinal foot piece 43 arranged generally perpendicular to the support beam 23 at an outer extent thereof opposite the pivot leg 33. The foot piece 43 rests on the flat utility transport area 17 (see FIG. 8) defined between the side rails 19, 21 when the rack is in place on the golf cart. The support beam also has a bag support plate (45 in FIG. 1) which extends upwardly from the foot piece 43 for supporting an end of a golf bag in use. In other words, the bag support plate 45 keeps a golf bag from slipping through the bag support elements 25, 27.

As will be appreciated from FIG. 8, the support beam 23 of the accessory rack forms an angle "α" with respect to the flat utility transport area 17 of the cart when in place. The particular angle is selected to orient a golf bag at a convenient angle to allow a player to select a desired club from the golf bag during play. While the exact angle may again vary somewhat depending upon the cart configuration, the angle that the support beam forms with respect to the flat utility transport area of the cart will generally be in the range from about 30 to 60 degrees.

In use, the accessory rack of the invention is easily mounted on the golf cart by arranging the rack 11 within the utility transport area 17, as shown in FIG. 8. The foot piece 43 of the rack rests on the flat utility area and the pivot leg 33 is attached at its outer extent to the side rail 19 by the attachment bracket 39. A pair of the accessory racks can conveniently be mounted in oppositely arranged fashion in the flat utility transport area of the golf cart, as will be appreciated from FIG. 8.

The accessory racks of the invention offer several advantages for a golfer driving a motorized cart. The racks are simple in design and economical to manufacture. They can easily and conveniently be installed in temporary or semi-permanent fashion in a variety of commercially available golf carts, generally without the need to modify the cart design to any appreciable extent. The racks securely mount a golf bag on a golf cart at a convenient angle which makes it easy for the golfer to access the bag contents, as to select a particular club to be used on a particular hole. The pivot leg design of the rack allows a single rack design to be used on golf carts of varying dimensions in the utility transport area.

While the invention has been shown in only one of its forms, it is not thus limited but is susceptible to various changes and modifications without departing from the spirit thereof.

What is claimed is:

1. A method of securing one or more golf bags in a golf cart where the golf cart has a fold-out rear seat area that forms a flat utility transport area defined between side rails when folded-out, the side rails being perpendicular to a seating area and also to a rear bumper area of the golf cart and being spaced apart from one another by a distance which defines the flat utility transport area of the golf cart, the method comprising the steps of:

first, folding-out the rear seat area of the golf cart to form the flat utility transport area;

providing an accessory rack for securing a golf bag within the utility transport area so formed, the accessory rack having a centrally located support beam and a pair of bag receiving elements in spaced apart fashion at each of opposite ends of the centrally located support beam, the bag receiving elements defining a pair of generally U-shaped openings;

providing a pivot leg for attaching the centrally located support beam to a selected side rail of the transport area so that the centrally located support beam is oriented perpendicular to the side rails of the golf cart by the pivot leg, the pivot leg having an inner extent attached to the support beam at a pivot point and having an oppositely arranged outer extent which terminates in an attachment bracket which engages the selected side rail of the transport area of the cart;

wherein the centrally located support beam has a longitudinal foot piece arranged generally perpendicular to the support beam at an outer extent thereof opposite the pivot leg which rests on the flat utility transport area defined between the side rails when the rack is in place on the golf cart, the support beam also having a bag support plate which extends upwardly and slightly outwardly from the foot piece for supporting an end of a golf bag in use;

mounting the accessory rack within the utility transport area of the cart, the accessory rack being mounted in temporary fashion within the utility transport area so that it can be easily and conveniently removed when desired;

placing the golf bag on the accessory rack within the U-shaped openings on the support beam.

2. The method of claim 1, wherein the support beam forms an angle with respect to the flat utility transport area of the cart when in place, the angle being selected to orient a golf bag at a convenient angle to allow a player to select a desired club from the golf bag during play.

3. The method of claim 2, wherein the angle that the support beam forms with respect to the flat utility transport area of the cart is in the range from about 30 to 60 degrees.

4. The method of claim 1, wherein a pair of accessory racks are mounted in an oppositely arranged fashion in the flat utility transport area of the golf cart.

5. A method of securing one or more golf bags in a first golf cart where the first golf cart has a fold-out rear seat area that forms a flat utility transport area defined between side rails when folded-out, the side rails being perpendicular to a seating area and also to a rear bumper area of the first golf cart and being spaced apart from one another by a distance which defines the flat utility transport area of the first golf cart, the method comprising the steps of:

first, folding-out the rear seat area of the first golf cart to form the flat utility transport area;

providing an accessory rack for securing a golf bag within the utility transport area so formed, the accessory rack having a centrally located support beam and a pair of bag receiving elements in spaced apart fashion at each of opposite ends of the centrally located support beam, the bag receiving elements defining a pair of generally U-shaped openings;

providing a pivot leg for attaching the centrally located support beam to a selected side rail of the transport area so that the centrally located support beam is oriented perpendicular to the side rails of the first golf cart by the pivot leg, the pivot leg having an inner extent attached to the support beam at a pivot point and having an oppositely arranged outer extent which terminates in an attachment bracket which engages the selected side rail of the transport area of the first golf cart;

wherein the centrally located support beam has a longitudinal foot piece arranged generally perpendicular to the support beam at an outer extent thereof opposite the pivot leg which rests on the flat utility transport area defined between the side rails when the rack is in place on the first golf cart, the support beam also having a bag support plate which extends upwardly and slightly outwardly from the foot piece for supporting an end of a golf bag in use, the support beam of the accessory rack forming a first angle with respect to the flat utility transport area of the first golf cart which is selected to orient the golf bag at a convenient angle to allow a player to select a desired club from the golf bag during play;

mounting the accessory rack within the utility transport area of the first golf cart, the accessory rack being mounted in temporary fashion within the utility transport area so that it can be easily and conveniently removed when desired;

placing the golf bag on the accessory rack within the U-shaped openings on the support beam;

consequently using the accessory rack in a second, different golf cart of varying dimensions from the first golf cart by again temporarily installing the accessory rack as previously described, and wherein the pivot leg is pivoted about the pivot point to form a different angle with respect to the flat utility transport area of the second golf cart while still forming a convenient angle to allow a player to select a desired club from the golf bag during play;

installing a golf bag in the accessory rack of the second golf cart.

6. The method of claim 5, wherein the angle that the support beam forms with respect to the flat utility transport area of both the first and second golf carts is in the range from about 30 to 60 degrees.

7. The method of claim 5, wherein a pair of accessory racks are mounted in an oppositely arranged fashion in the flat utility transport area of the golf cart.

8. A method which uses a combination of an accessory rack with a centrally located support beam and a side rail of a golf cart for securing one or more golf bags in a first golf cart where the first golf cart has a fold-out rear seat area that forms a flat utility transport area defined between side rails when folded-out, the side rails being perpendicular to a seating area and also to a rear bumper area of the first golf cart and being spaced apart from one another by a distance which defines the flat utility transport area of the first golf cart, the method comprising the steps of:

first, folding-out the rear seat area of the first golf cart to form the flat utility transport area;

providing an accessory rack for securing a golf bag within the utility transport area so formed, the accessory rack having a centrally located support beam and a pair of bag receiving elements in spaced apart fashion at each of opposite ends of the centrally located support beam, the bag receiving elements defining a pair of generally U-shaped openings;

providing a pivot leg for attaching the centrally located support beam to a selected side rail of the transport area so that the centrally located support beam is oriented perpendicular to the side rails of the first golf cart by the pivot leg, the pivot leg having an inner extent attached to the support beam at a pivot point and having an oppositely arranged outer extent which terminates in an attachment bracket which engages the selected side rail of the transport area of the first golf cart;

wherein the centrally located support beam has a longitudinal foot piece arranged generally perpendicular to the support beam at an outer extent thereof opposite the pivot leg which rests on the flat utility transport area defined between the side rails when the rack is in place on the first golf cart, the support beam also having a bag support plate which extends upwardly and slightly outwardly from the foot piece for supporting an end of a golf bag in use, the support beam of the accessory rack forming a first angle with respect to the flat utility transport area of the first golf cart which is selected to orient the golf bag at a convenient angle to allow a player to select a desired club from the golf bag during play;

mounting the accessory rack within the utility transport area of the first golf cart, the accessory rack being mounted in temporary fashion within the utility transport area so that it can be easily and conveniently removed when desired;

placing the golf bag on the accessory rack within the U-shaped openings on the support beam;

consequently using the accessory rack in a second, different golf cart of varying dimensions from the first golf cart by again temporarily installing the accessory rack as previously described, and wherein the pivot leg is pivoted about the pivot point to form a different angle with respect to the flat utility transport area of the second golf cart while still forming a convenient angle to allow a player to select a desired club from the golf bag during play;

installing a golf bag in the accessory rack of the second golf cart.

* * * * *